(12) United States Patent
Hamilton et al.

(10) Patent No.: US 7,353,230 B2
(45) Date of Patent: Apr. 1, 2008

(54) DYNAMIC DISTRIBUTED CUSTOMER ISSUE ANALYSIS

(75) Inventors: William Eugene Gunnther Hamilton, San Jose, CA (US); Christopher Paul Oggerino, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 327 days.

(21) Appl. No.: 11/109,236

(22) Filed: Apr. 18, 2005

(65) Prior Publication Data
US 2006/0235709 A1    Oct. 19, 2006

(51) Int. Cl.
G06F 7/00 (2006.01)
G06F 17/30 (2006.01)
(52) U.S. Cl. .......................... 707/10; 707/103; 705/9; 714/57; 395/183.15
(58) Field of Classification Search .................... 707/3, 707/6, 10, 103; 705/9; 395/183.15; 714/57
See application file for complete search history.

(56) References Cited

U.S. PATENT DOCUMENTS

| | | | |
|---|---|---|---|
| 5,790,779 A * | 8/1998 | Ben-Natan et al. ........... 714/39 |
| 6,526,529 B1 * | 2/2003 | Miksovsky et al. ........... 714/57 |
| 6,735,591 B2 | 5/2004 | Khan | |
| 7,080,101 B1 | 7/2006 | Watson et al. | |
| 2003/0163380 A1 * | 8/2003 | Vaccarelli et al. ............ 705/26 |
| 2005/0060217 A1 * | 3/2005 | Douglas et al. ................ 705/9 |
| 2005/0172170 A1 * | 8/2005 | Thieret et al. ................ 714/37 |
| 2005/0234973 A1 * | 10/2005 | Zeng et al. ............. 707/103 R |
| 2006/0156077 A1 * | 7/2006 | Altaf et al. .................... 714/57 |
| 2006/0184492 A1 * | 8/2006 | Long et al. ................... 706/47 |

FOREIGN PATENT DOCUMENTS

WO    WO 98/53396    * 11/1998

* cited by examiner

Primary Examiner—Wilson Lee
Assistant Examiner—Marie Antoinette Cabucos
(74) Attorney, Agent, or Firm—Stolowitz Ford Cowger LLP (57) ABSTRACT

Methods and systems for managing a distributed and dynamic review of a set of information are described. A set of information instances (e.g., case summaries) are distributed over a computer system network to reviewer nodes. A list of review items (e.g., problem types) against which the information instances are to be reviewed are also distributed over the computer system network to the reviewer nodes. An updated list of review items is distributed over the computer system network to the reviewer nodes each time a change to the list of review items is received from any of the reviewer nodes.

19 Claims, 5 Drawing Sheets

HW Family:2600   HW Line:2611
HW ID:C2611-2E/VPN/K8   SW ID:12.0(12.1)
SW Version:c1000-bnsy-
mz 120-12.1

Review Section (Case# 600001458)

Problem Description(2500 char):

Case Notes Rating:
○ ★★★★★   ○ ★★★★   ○ ★★★   ○ ★★   ○ ★

Original Problem Type 1: Software Initial Installation - General Questions
Original Problem Type 2: None
My Problem Type 1: <Select>
My Problem Type 2: <Select>        } 510
Technology Level1: Routing Protocols (Includes NAT and HSRP)
Technology Level2: Routing - General Issues Issue Level1: HW-Processor Card
Issue Level2: Issue 57
Attribute:
☐ ATT 1
☐ ATT 2
☐ ATT 3

[Save]  [Save & Next]  [Save & Close]
[Next] [List] [Close]

DYNAMIC DISTRIBUTED CUSTOMER ISSUE ANALYSIS

TECHNICAL FIELD

Embodiments of the present invention pertain to the review and analysis of information in a database.

BACKGROUND ART

Many businesses maintain call centers or the like, for receiving calls from customers who have questions or problems. When a customer calls, a case is opened and assigned a number, and pertinent information, including a summary of the problem, is recorded. The case remains open until the problem is resolved. Oftentimes, the solution to the problem is also recorded.

Case records are stored so that they can be later retrieved and analyzed. The knowledge gained from the case records can be utilized to affect product development. For example, case records can be reviewed to identify recurrent problems and their solutions, in order to identify fixes that can be incorporated into the next generation of products.

Conventional techniques for analyzing historical records can be cumbersome and difficult. For example, a reviewer will typically select (or be assigned) some number of records for a product or class of products, then tally by hand the number of occurrences of each type of problem.

Conventional techniques for analyzing historical records may also be non-repeatable and inaccurate. For example, based on information from past reviews, a reviewer may be provided with an initial list of potential problems. If the reviewer comes across a new type of problem that is not on the list, the reviewer will likely make up a name for the problem and add it to the list. However, another reviewer, conducting a separate review of another set of records, may identify the same problem by a different name. This lack of constancy across reviews can be problematic when the review results are subsequently analyzed. For example, even though a problem may be common to a number of records, it may not be recognized as such because it is named differently by different reviewers.

Accordingly, a system and/or method for reviewing records more efficiently and accurately would be advantageous.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "distributing," "sorting," "selecting," "accessing," "providing," "associating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments in accordance with the present invention pertain generally to the analysis of information that is distributed to a number of reviewer nodes. Reviewers at each of the review nodes can review the information collaboratively against a same list of review items, even if the reviewer nodes are not proximate to one another. If a reviewer updates the list of review items, then the updated list can be distributed to the other reviewers. Also, as each reviewer completes a review of an instance of the information, updated review results can be distributed to the other reviewers.

Figure 1:
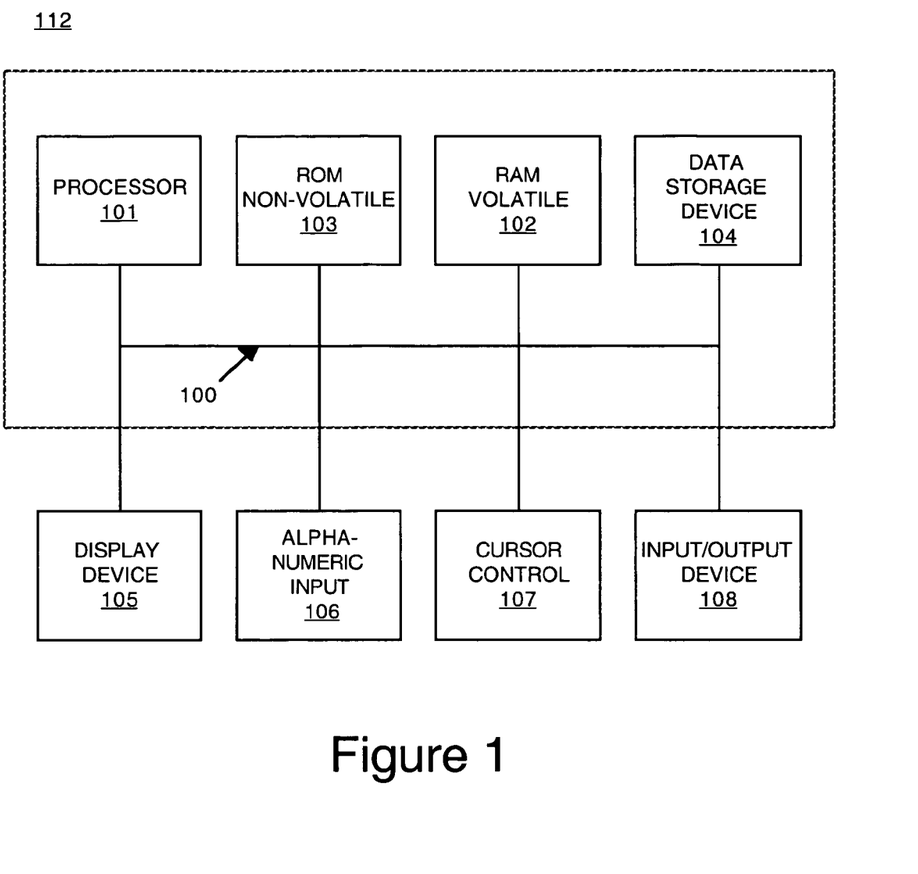
FIG. 1 is a block diagram of an exemplary computer system upon which embodiments of the present invention may be implemented.

Referring first to FIG. 1, a block diagram of an exemplary computer system 112 is shown. It is appreciated that computer system 112 described herein illustrates an exemplary configuration of an operational platform upon which embodiments of the present invention can be implemented. Nevertheless, other computer systems with differing configurations can also be used in place of computer system 112 within the scope of the present invention. That is, computer system 112 can include elements other than those described in conjunction with FIG. 1.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions.

Also included in computer system 112 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 may also include wireless communication mechanisms. Using communication interface 108, computer system 112 can be communicatively coupled to other computer systems over a communication network such as the Internet or an intranet (e.g., a local area network).

Figure 2:
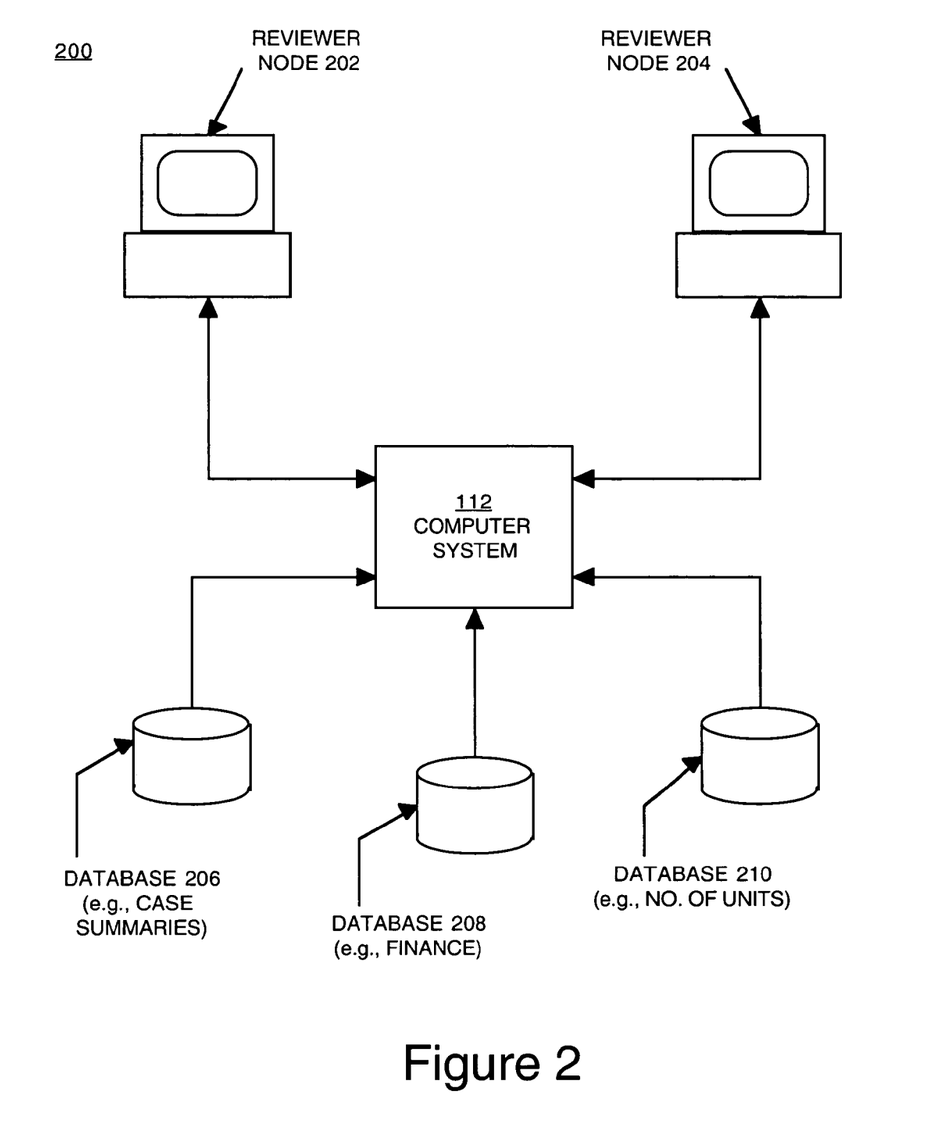
FIG. 2 is a block diagram of an exemplary computer system network upon which embodiments of the present invention may be implemented.

FIG. 2 is a block diagram of an exemplary computer system network 200 upon which embodiments of the present invention may be implemented. In the example of FIG. 2, computer system 112 is coupled to (in communication with) reviewer nodes 202 and 204. Computer system 112 is also coupled to (in communication with) databases 206, 208 and 210. Network 200 can include elements other than those described in conjunction with FIG. 2. For example, a computer system having functionality similar to that of computer system 112 can be used in parallel with computer system 112, for load balancing for example. Furthermore, there may be any number of reviewer nodes and databases. Computer system 112 can communicate with the other elements of network 200 either via wired or wireless connections (or a combination thereof).

Reviewer nodes 202 and 204 can be computer systems similar to computer system 112. In general, reviewer nodes 202 and 204 provide the capability to store, process and display information, and to communicate with computer system 112. Reviewer nodes 202 and 204 may be physically remote from each other; for example, one reviewer node may be in one part of the world and another reviewer node in another part of the world.

Databases 206, 208 and 210 are repositories of information that are accessible by computer system 112. The databases 206, 208 and 210 may be separate from or resident on computer system 112. In the example of FIG. 2, database 206 includes instances of information that are to be reviewed, and the databases 208 and 210 include other information that may be used in the analysis of the review results. In one embodiment, database 206 includes what are referred to herein as "case summaries," database 208 includes financial information, and database 210 includes information such as inventory information (e.g., the number of units of different types of products that have been shipped). Databases 206, 208 and 210 may contain other types of information.

In one embodiment, the case summaries of database 206 include information derived from customer contacts. The customer contacts can have many forms, such as a phone call or an e-mail message. A customer may contact a call center maintained by a manufacturer or vendor with a question or to report a problem with a particular product. At the call center, a case is opened and details about the customer contact are recorded in a case summary. The technician or representative taking the call, in addition to entering information of an unequivocal nature (e.g., the customer's name, the product type, a serial number, etc.), may attempt to categorize the type of problem. Once the customer issue is resolved, the case summary may be updated to recategorize the type of problem and to record the solution. Each case summary is assigned a unique case number.

In one embodiment, the financial information of database 208 includes information that can be used to assign a monetary value to either each of the various issues captured by the case summaries or to each of the case summaries themselves. For example, depending on the type of problem raised in a call to the call center, the caller may be referred to one of a number of technical assistance centers for consultation and resolution. The technical assistance centers may have different overhead costs; for example, the staff of a technical assistance center that deals with more complex issues may include experts that cost more than the staff of a technical assistance center that deals with problems of a more general nature. Accordingly, the financial information of database 208 can include information that assigns a dollar value to a call depending on the technical assistance center to which the call is routed. By extension, that dollar value can also be assigned to the case summary associated with the call, and to the problem type(s) recorded in the case summary.

In one embodiment, the inventory information of database 210 includes information that can be used for subsequent problem and product analyses. For example, database 210 may include information regarding how many units of a particular product type have been sold, so that the number of units having a problem can be determined as a percentage of the total number of units sold or in use.

In overview, according to one embodiment of the present invention, a set of case summaries is selected from database 206. The set of case summaries can be selected according to one or more of the various attributes contained within the case summaries. For example, a set of case summaries associated with a particular product type can be selected.

The selected set of case summaries are then distributed to a number of selected reviewers at respective reviewer nodes (e.g., reviewer nodes 202 and 204). In one embodiment, each of the selected reviewers is assigned a subset of case summaries that is independent of the other subsets in the selected set of case summaries. That is, in one embodiment, each case summary is contained in only one of the subsets of the set of selected case summaries.

The reviewers review each of the case summaries that they have been assigned. As a reviewer reads a case summary, the reviewer can make a determination of the type of problem reported by the customer. The reviewer's determination of the problem type may be the same as that originally recorded in the case summary, or it may be different.

Each reviewer is provided with an initial list of problem types that can be used to facilitate problem categorization. The list may be a standard list of problem types, perhaps customized according to the set of case summaries selected for the review. That is, for example, if a particular product type is selected for the review, the initial list of problem types may be a standardized list that is based on past problems associated with that product type. Alternatively, the initial list of problem types may be generated by one of the reviewers.

As the reviewers perform their review, a reviewer may identify a new problem type not on the current list of problem types. Significantly, according to embodiments of the present invention, that reviewer can modify the list of problem types to include the new problem type. Also of significance, the updated list of problem types is then made immediately available to other reviewers. Thus, according to embodiments of the present invention, a team of reviewers can conduct a review of a set of case summaries in collaboration, even if the reviewers are apart from each other.

To accomplish the above, a software tool or agent is installed on computer system 112, and reciprocal software tools or agents are installed on the reviewer nodes 202 and 204. In one embodiment, the distribution of information to the reviewer nodes 202 and 204 is analogous to the distribution of Web-based information. For example, the case summaries may be represented as Web pages that are rendered at the reviewer nodes. However, the present invention is not so limited. For example, the case summaries may instead be represented as text-based (e.g., word processing) files that are forwarded to the reviewer nodes.

Figure 3:
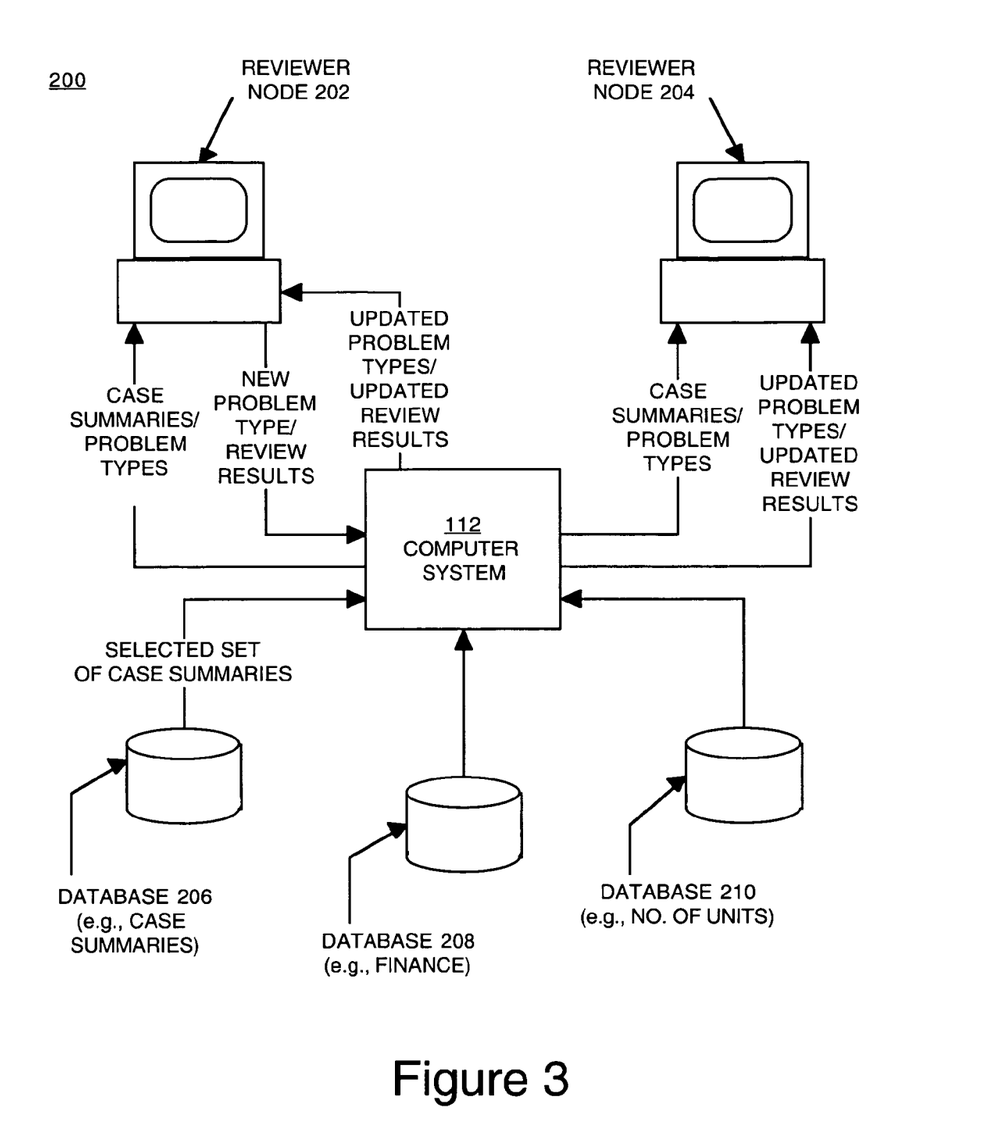
FIG. 3 is a block diagram showing a flow of information in a computer system network in accordance with an embodiment of the present invention.

FIG. 3 is a block diagram showing a flow of information in a network 200 in accordance with an embodiment of the present invention. In the example of FIG. 3, computer system 112 retrieves a selected set of case summaries from database 206 and distributes the selected case summaries to the reviewer nodes 202 and 204. As mentioned above, the case summaries may be represented in different forms. Thus, as used herein, terms such as "distribution of" or "forwarding of" or "access to" a case summary means that a reviewer node receives information (e.g., electronic information) that can be used by the reviewer node to render the case summary in a form that can be reviewed.

As mentioned above, there may be more than two reviewer nodes. Also, as will be understood from the discussion below, any of the review nodes can function in the centralized role performed by computer system 112, and computer system 112 can also be employed as a reviewer node.

As mentioned above, the set of case summaries selected for review can be selected using any one or more of the attributes contained within the various case summaries. Furthermore, once the initial set of case summaries has been selected using an attribute or attributes, the set of case summaries to be reviewed can be readily expanded by applying the same attribute(s) to database 206 to retrieve additional case summaries.

A reviewer at each reviewer node is assigned a subset of case summaries to review. Generally speaking, it may be desirable to prevent a case summary from being reviewed by multiple reviewers, and different mechanisms can be employed to avoid a duplication of effort. In one embodiment, the subsets of case summaries assigned to reviewers are disjoint subsets.

Also, an initial list of problem types that is to be applied to the review is provided to each reviewer node, as described above.

In the example of FIG. 3, a reviewer at reviewer node 202 has completed a review of at least one of the case summaries and records the results. In one embodiment, a graphical user interface (GUI) is displayed to the reviewer, and the reviewer can enter the review result(s) into the appropriate field(s) of the GUI (see FIG. 5, for example). In essence, for each case summary, the reviewer selects one or more problem types from the aforementioned list of problem types.

Also in the example of FIG. 3, the user has identified a new problem type (e.g., a problem type not on the list of problem types). The new problem type is also entered into the appropriate field of the GUI.

According to embodiments of the present invention, the review results and the new problem type are received by computer system 112 from reviewer node 204, and are immediately distributed to each of the reviewer node(s). Thus, updated review results and an updated list of problem types are immediately available to other reviewers at other reviewer nodes. Significantly, each review is performed using the same list of problem types, even if the list is updated to identify new problem types. In this manner, a consistent and collaborative review is accomplished across the entire set of selected case summaries, even if the reviewers are working at physically remote locations. Also, as each reviewer conducts his or her review, each reviewer applies the same list of problem types, even if the reviews are not conducted at the same time.

Figure 4:
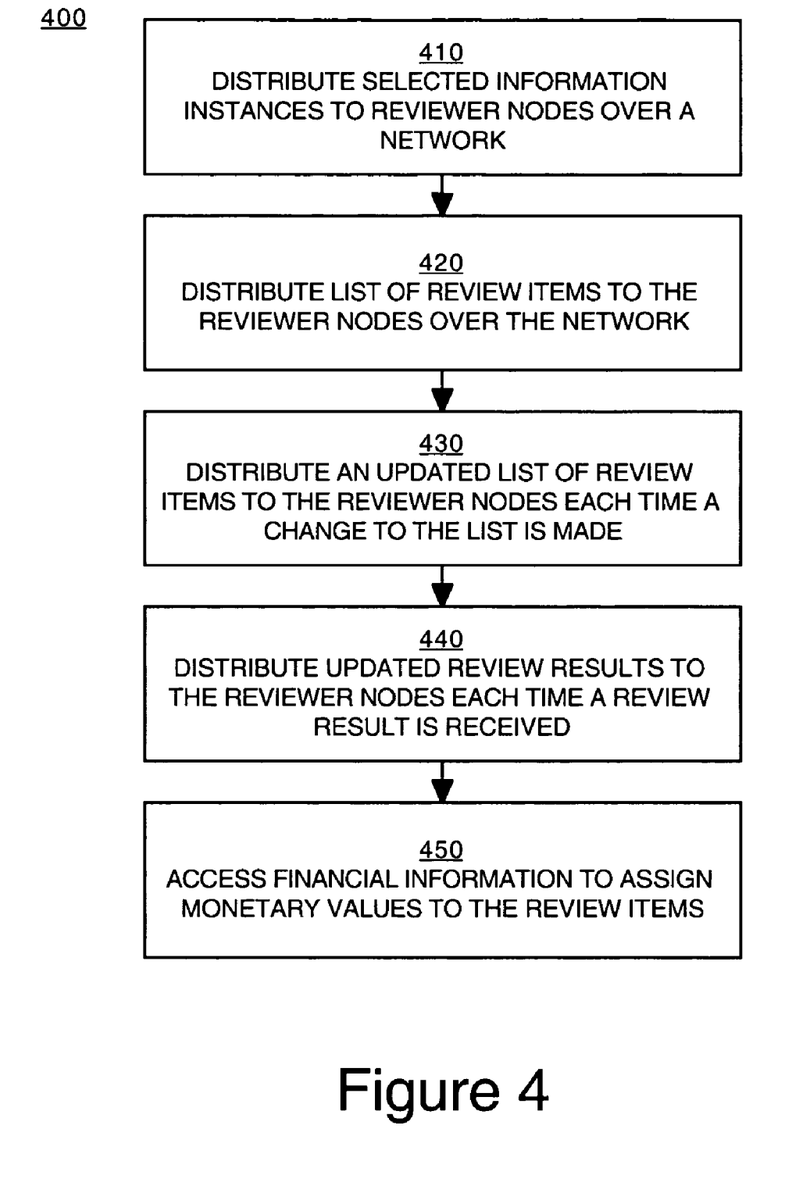
FIG. 4 is a flowchart of a method for managing a review of a set of information according to an embodiment of the present invention.

FIG. 4 is a flowchart 400 of a method for managing a review of a set of information according to an embodiment of the present invention. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed. In one embodiment, flowchart 400 is implemented as computer-readable program code stored in a memory unit of computer system 112 and executed by processor 101 (FIG. 1).

In block 410 of FIG. 4, a selected set of information instances (e.g., case summaries) is distributed to reviewer nodes over a computer system network.

In block 420, in one embodiment, a list of review items (e.g., problem types) that is to be used during the review of the selected set of information instances (e.g., case summaries) is also distributed to the reviewer nodes over the network.

In block 430, in one embodiment, each time a change to the list of review items (e.g., problem types) is received from any of the reviewer nodes, an updated list of review items (problem types) is distributed to the reviewer nodes over the network. If reviewers are conducting their reviews at the same time, each reviewer can see in real time any change made to the list of review items (problem types).

In block 440, in one embodiment, each time a review result is received from any of the reviewer nodes, an updated summary of the review results is distributed to the reviewer nodes over the network. If reviewers are conducting their reviews at the same time, each reviewer can see in real time the review results from each reviewer.

In block 450, in one embodiment, a monetary value can be assigned to each of the review items (problem types) using information provided in either the information instances (case summaries) or in the summary of review results. For example, a case summary can identify which technical assistance center was involved with solving a customer problem. As previously described herein, different monetary values can be associated with different technical assistance centers. Accordingly, a cost (e.g., in dollars) can be assigned to the case summary and as such to each problem type(s) identified by the case summary.

In a specific implementation in accordance with one embodiment of the present invention, a lead individual assembles a team of reviewers and selects the case summaries to be reviewed in the review session. The lead can provide each user with a unique identifier (ID) and assigns to each reviewer a subset of the case summaries to be reviewed. The reviewers are provided with a link to a directory (perhaps identified by a Uniform Resource Locator) on computer system 112 (FIGS. 2 and 3) that is unique to the review session. The link provides the reviewers with access to their respective case summaries, and allows the reviewers to post their review results and to amend the list of problem types. In a manner similar to that used by a Web site to distribute information to a number of Web browsers, an application (e.g., a software tool or agent) executing on computer system 112 distributes case summaries, up-to-date review results, and an up-to-date list of problem types to each of the reviewer nodes (e.g., reviewer nodes 202 and 204 of FIGS. 2 and 3).

During the review, the lead can track the progress of the various reviewers. If there are multiple review sessions in progress, the progress of each session can be tracked. The lead can control completion of the review session, by either reviewing assigned case summaries that have not yet been reviewed, by assigning unreviewed case summaries to other reviewers, or by removing unreviewed case summaries from the review session. Similarly, case summaries can be added to the review session.

A reviewer's access to a review session can be revoked once the reviewer has finished reviewing the case summaries he or she has been assigned. Access to the review session can also be terminated after a predefined time period has expired.

Figure 5:
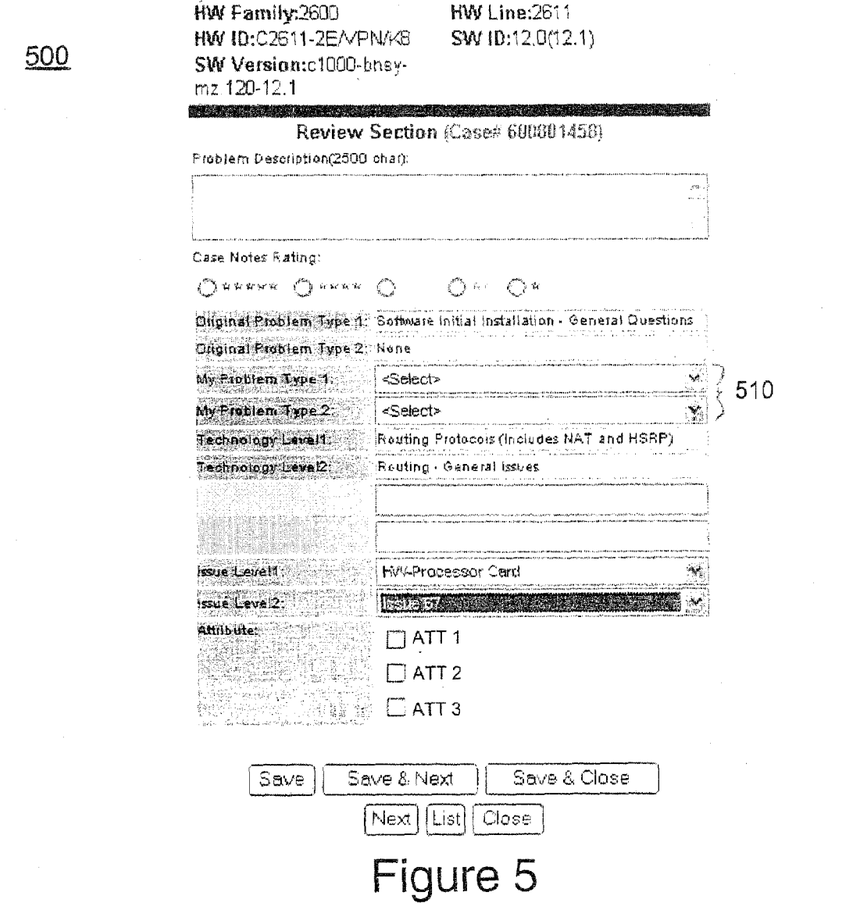
FIG. 5 illustrates an example of a user interface according to an embodiment of the present invention.

FIG. 5 illustrates an example of a graphical user interface (GUI) 500 presented to a reviewer according to an embodiment of the present invention. In the example of FIG. 5, the GUI 500 provides product information (e.g., hardware family and hardware line, hardware identifier, software identifier, and software version) culled from a particular case summary.

As mentioned previously herein, a call center operator or technician may categorize the type of problem reported by a caller and record that information in the case summary. This information appears in the GUI 500 in the fields labeled "original problem type 1" and "original problem type 2." If the reviewer decides that the problem should be recategorized, the reviewer uses the dropdown menus 510 to select a problem type from the list of problem types previously described herein. The list of problem types presented to the reviewer in the dropdown menus 510 is the updated list that incorporates new problem types that may be generated by other reviewers, as previously described herein. That is, in one embodiment, as each reviewer amends the list of problem types being applied in the review session, the dropdown menus 510 are automatically updated to reflect the up-to-date list of problem types.

Other information can be included in the GUI that is presented to the reviewer. In the example of FIG. 5, GUI 500 includes fields that identify the technology levels and issue levels associated with the product/problem type, attributes (e.g., ATT1, ATT2 and ATT3 of FIG. 5) that help further define the problem, and a text field allowing the reviewer to describe the problem. Some of the information presented to the reviewer may be based on the initial assessment made by the call center operator or technician; the GUI can include fields allowing the reviewer to revise such information. The GUI can also include fields that allow the reviewer to identify a root cause and a proposed solution to each problem.

In one embodiment, the present invention includes features that allow the review results to be exported into a spreadsheet application and optionally graphed, in order to facilitate analysis of the review results. In one such embodiment, the review results include, but are not limited to, the types of information listed in Table 1, below.

TABLE 1

Examples of Information Included in the
Results of a Review of a Case Summary

Figure 6:
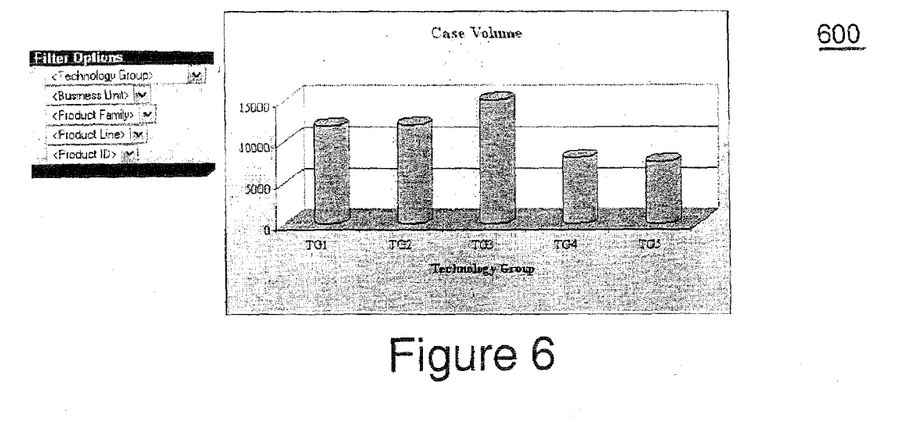
FIG. 6 illustrates an example of a display of the results from a review of information according to an embodiment of the present invention.

Case ID
Title
Priority
Problem type 1
Problem type 2
Revised problem type 1
Revised problem type 2
Hardware family
Hardware line
Hardware product ID
Hardware business unit
Software family
Software line
Software product ID
Software business unit
Open date
Close date
Elapsed time
Owner
Customer name
Site ID
Contract number
Technical Assistance Center ID
Technical level 1
Technical level 2
Revised technical level 1
Revised technical level 2
Case review ID
Problem summary
Root cause
Proposed solution
Case comments FIG. 6 illustrates an example of a display (e.g., a graph) 600 of the results from a review of information according to an embodiment of the present invention. In the example of FIG. 6, the results are sorted by "technology group;" however, the present invention is not so limited. That is, different filters can be applied to the review results, so that they can be sorted on other attributes. In general, the review results can be sorted using virtually any of the attributes contained in a case summary or in a review summary (e.g., the attributes listed in Table 1).

In summary, embodiments in accordance with the present invention allow a team of reviewers to perform a collaborative review of a database of information, such as (but not limited to) a database of case summaries containing information gathered from customer contacts with call centers and the like. By creating and maintaining a list of review items (e.g., problem types) that is always up-to-date for all reviewers, the review can be accomplished more efficiently and accurately. Furthermore, financial information can be joined with the review results so that a cost can be associated with each information instance (e.g., case summary) or with each review item (problem type) associated with an information instance (case summary). Review results can be exported to a spreadsheet application and/or presented graphically so that analysis of the results can be more readily performed. Although described for a particular application, features of the present invention, in its various embodiments, may be utilized to review and analyze types of information that are different from that described herein.

Embodiments of the present invention are thus described. While the present invention has been described in particular embodiments, it should be appreciated that the present invention should not be construed as limited by such embodiments, but rather construed according to the below claims.

What is claimed is:

1. A method, comprising:
    populating a computer database with a plurality of summaries, the summaries representing information obtained from customer contacts communicating with customers regarding problems with purchased products;
    selecting a subset of the summaries for review and classification by nodes that are located remotely with respect to each other;
    distributing, across a computer network and to the nodes, a problem type classification list together with the subset of case summaries, the problem type classification list including a plurality of problem type selections to be used by the nodes when classifying the distributed case summaries;
    receiving a communication from one of the nodes, the communication identifying a problem type that is not represented by the problem type selections included in the problem type classification list; and
    distributing an updated problem type classification list to all the nodes responsive to receiving the communication, the updated problem type classification list including a new problem type selection representing the problem type identified by the received communication;
    wherein the nodes perform a collaborated classification of the summaries by making selections from the updated problem type classification list.

2. The method of claim 1 wherein the problem type classification list is displayed at the nodes using a drop down menu and the method further comprises:
    the nodes automatically updating and extending the drop down menu to include the new problem type selection responsive to receiving the updated problem type classification list.

3. The method of claim 2 further comprising:
    receiving classification reports from the nodes, wherein the classification reports indicate that at least one of the summaries was reclassified from an original problem type classification to a different problem type classification during the review by the nodes; and
    storing the classification reports in the computerized database.

4. The method of claim 3 wherein the summaries represent reported issues for products belonging to a same product family and the problem type selections describe known hardware and software issues for the products.

5. The method of claim 4 wherein the problem type selections describe the known issues by indicating a subsystem of the product and an issue number.

6. The method of claim 1 wherein the selection of the subset of summaries is controlled by signals originating from a supervising one of the nodes.

7. An apparatus, comprising:
    one or more processors; and
    a memory coupled to the processors comprising instructions executable by the processors, the processors operable when executing the instructions to:
    select case summaries to be reviewed by a plurality of remote reviewing nodes;
    analyze the selected case summaries to identify problem types associated with the selected case summaries;
    generate an initial problem type list to be selected from by the remote reviewing nodes when categorizing the selected case summaries according to problem type, the initial problem type list being customized according to the analysis such that the initial problem type list includes only the problem types identified during the analysis;
    distribute the initial problem type list and information representing the selected case summaries to the reviewing nodes;
    receive a communication indicating that one of the reviewing nodes has associated, with the selected case summaries, a new problem type that is not included in the initial problem type list; and
    generate and distribute an updated problem type list to be selected from by the remote reviewing nodes when categorizing the selected case summaries according to problem type, the updated list of problem types including the new problem type.

8. The apparatus of claim 7 wherein the reviewing nodes collaborate by categorizing the selected case summaries using the same problem type list.

9. The apparatus of claim 7 wherein the distributed case summaries include information derived from customer contacts, and at least one of the distributed case summaries includes an initial problem type categorization that is designated by the customer contacts and different than the problem type categorization selected by the reviewing node.

10. The apparatus of claim 9 wherein each distributed case summary is associated with a unique case number and the processors are further operable to:
    obtain financial information corresponding to at least a portion of the unique case numbers; and
    distribute the financial information to the reviexving nodes.

11. The apparatus of claim 7 wherein the processor are further operable to select the case summaries to be reviewed by filtering a database of case summaries according to model number.

12. The apparatus of claim 7 wherein the selected case summaries are distributed as disjoint subsets.

13. The apparatus of claim 7 wherein the updated problem type list is transferred to all the reviewing nodes.

14. A system, comprising:
    means for populating a computer database with a plurality of summaries, the summaries representing information obtained from customer contacts communicating with customers regarding problems with purchased products;
    means for selecting a subset of the summaries for review and classification by nodes;
    means for distributing a problem type classification list and the subset of case summaries to the nodes, the problem type classification list including a plurality of problem type selections to be used by the nodes when classifying the distributed case summaries;

means for receiving a communication identifying a problem type that is not represented by the problem type selections included in the problem type classification list; and means for distributing an updated problem type classification list to the nodes responsive to receiving the communication, the updated problem type classification list including a new problem type selection representing the problem type identified by the received communication;

wherein the nodes perform a collaborated classification of the summaries according to the problem type selections included in the updated problem type classification list.

15. The system of claim 14 further comprising:

means for receiving classification reports from the nodes, wherein the classification reports indicate that at least one of the summaries was reclassified from an original problem type classification to a different problem type classification during the review by the nodes; and means for storing the reports in the computerized database.

16. The system of claim 14 wherein the problem type classification list is displayed at the nodes using a graphical selection menu and the system further comprises:

means for automatically updating and extending the graphical selection menu to include the new problem type selection responsive to receiving the updated problem type classification list.

17. The system of claim 16 wherein the summaries represent reported issues for products belonging to a same product family and the problem type selections describe known hardware and software issues for the products.

18. The system of claim 17 wherein the problem type selections describe the known issues by indicating a subsystem of the product and an issue reference indicator.

19. The system of claim 14 wherein the selection of the subset of summaries is controlled by signals originating from a supervising one of the nodes.

* * * * *

UNITED STATES PATENT AND TRADEMARK OFFICE
CERTIFICATE OF CORRECTION

PATENT NO. : 7,353,230 B2 Page 1 of 1
APPLICATION NO. : 11/109236
DATED : April 1, 2008
INVENTOR(S) : Hamilton et al.

It is certified that error appears in the above-identified patent and that said Letters Patent is hereby corrected as shown below:

At column 10, line 47, please replace "reviexving" with --reviewing--.

Signed and Sealed this

Thirty-first Day of March, 2009

JOHN DOLL
*Acting Director of the United States Patent and Trademark Office*